United States Patent
Barkow et al.

(10) Patent No.: US 12,240,358 B2
(45) Date of Patent: Mar. 4, 2025

(54) METHOD FOR OPERATING A VEHICLE SEAT DEVICE, VEHICLE SEAT DEVICE

(71) Applicant: Volkswagen Aktiengesellschaft, Wolfsburg (DE)

(72) Inventors: Tomas Barkow, Braunschweig (DE); Christian Busch, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 765 days.

(21) Appl. No.: 17/372,010

(22) Filed: Jul. 9, 2021

(65) Prior Publication Data

US 2022/0009383 A1 Jan. 13, 2022

(30) Foreign Application Priority Data

Jul. 9, 2020 (DE) ...................... 10 2020 208 647.8

(51) Int. Cl.
*B60N 2/02* (2006.01)
*B60N 2/00* (2006.01)
*B60N 2/20* (2006.01)

(52) U.S. Cl.
CPC ......... *B60N 2/0252* (2013.01); *B60N 2/0025* (2023.08); *B60N 2/02246* (2023.08); *B60N 2/0273* (2023.08); *B60N 2/20* (2013.01); *B60N 2/0268* (2023.08)

(58) Field of Classification Search
CPC .. B60N 2/0252; B60N 2/002; B60N 2/02246; B60N 2/20; B60N 2/0268
USPC .......................................................... 701/49
See application file for complete search history.

(56) References Cited

U.S. PATENT DOCUMENTS

| 8,157,045 B2* | 4/2012 | Hashimoto .......... B60N 2/0276 180/274 |
| 2018/0222360 A1 | 8/2018 | Fournier |
| 2019/0232822 A1 | 8/2019 | Hintermaier |
| 2021/0237620 A1* | 8/2021 | Mizoi .................... B60N 2/002 |

FOREIGN PATENT DOCUMENTS

| DE | 19852541 C1 | 3/2000 |
| DE | 102016220997 A1 | 4/2018 |
| DE | 102017201822 A1 | 8/2018 |
| DE | 102019211169 A1 * | 1/2021 |

* cited by examiner

*Primary Examiner* — Tiffany P Young
*Assistant Examiner* — John D Holman
(74) *Attorney, Agent, or Firm* — Muncy, Geissler, Olds & Lowe, P.C.

(57) ABSTRACT

A method for operating a vehicle seat device for motor vehicles, which has a vehicle seat with a seat part and a backrest, associated with the seat part, and at least one actuator which is associated with the seat part and/or the backrest and by means of which the vehicle seat can be brought automatically into a sitting position and into a reclining position, wherein the movement takes place as a function of a desired position that can be specified by a user and of at least one detectable vehicle seat state. It is provided that a current temperature is monitored as the vehicle seat state and that if the monitored temperature falls below a limit temperature, the vehicle seat is brought into a sitting position or left in a current sitting position regardless of the desired position.

10 Claims, 2 Drawing Sheets

METHOD FOR OPERATING A VEHICLE SEAT DEVICE, VEHICLE SEAT DEVICE

This nonprovisional application claims priority under 35 U.S.C. § 119(a) to German Patent Application No. 10 2020 208 647.8, which was filed in Germany on Jul. 9, 2020 and which is herein incorporated by reference.

BACKGROUND OF THE INVENTION

Field of the Invention

The present invention relates to a method for operating a vehicle seat device for motor vehicles, which has a vehicle seat with a seat part and a backrest, associated with the seat part, and at least one actuator which is associated with the seat part and/or the backrest and by means of which the vehicle seat can be brought automatically into a sitting position and into a reclining position, wherein the movement takes place as a function of a desired position that can be specified by a user and of at least one detectable vehicle seat state.

The invention relates further to a vehicle seat device as described above, which also has a control device which controls the actuator as a function of a desired position for the vehicle seat which can be specified by a user and of at least one detectable vehicle seat state.

DESCRIPTION OF THE BACKGROUND ART

Methods and vehicle seat devices of the aforementioned type are already known from the state of the art. For example, DE 10 2016 220 997 A1, which corresponds to US 2019/0232822, discloses a generic method for operating an adjustable vehicle seat which can be shifted automatically by an actuator between a reclining position and a sitting position. The known method provides that the automatic adjustment of the vehicle seat is carried out as a function of at least one defined situation, wherein a driving speed of the motor vehicle having the vehicle seat is taken into account as a defined situation.

DE 198 52 541 C1 also discloses a method for operating a vehicle seat in which a seat occupancy of the vehicle seat is determined as a function of the output signal from a temperature sensor.

SUMMARY OF THE INVENTION

It is therefore an object of the present invention to ensure that a vehicle seat can be or is shifted at any time into a sitting position that is safe for the user of the vehicle seat, in particular a crash-safe sitting position.

For this purpose, it is provided according to an example of the invention that a current temperature is monitored as the vehicle seat state, and that if the monitored temperature falls below a predetermined limit temperature, the vehicle seat is brought into a sitting position or left in a current sitting position regardless of the desired position. The vehicle seat, which therefore can be adjusted automatically by the actuator between a sitting position and a reclining position, is only moved into the reclining position as a function of a current temperature if the current temperature does not fall below the predetermined limit temperature. This ensures that the vehicle seat is either already in a safe sitting position and remains in the sitting position despite an adjustment to the reclining position requested by the driver, or that the vehicle seat is in a reclining position and is brought into a sitting position contrary to the user's request. A sitting position is understood here to mean a sitting position that includes, for example, a backrest position in a predetermined angle range in which the backrest is set upright vertically or almost vertically. A reclining position is preferably to be understood as a position range of the vehicle seat, in particular of the backrest, in which a user lies or is almost lying on the vehicle seat, for which purpose, for example, the backrest is in a predetermined angle reclining range in which the backrest is oriented horizontally or almost horizontally.

A temperature of the vehicle seat can be monitored as the temperature. In this way, for example, the immediate ambient temperature of the vehicle seat is detected and conclusions can be drawn therefrom about the temperature of vehicle seat components, such as, for example, an actuator temperature, gear temperature, frame temperature, or the like, which can detrimentally affect the adjustability of the vehicle seat. By detecting the temperature of the vehicle seat, a precise determination of the temperature or temperatures relevant to the adjustment of the vehicle seat is advantageously ensured.

Furthermore, it can be provided that a gear temperature of a gear of the actuator or a motor temperature of a drive motor of the actuator is monitored as the temperature. The drive motor is coupled to the backrest and/or a footrest of the vehicle seat, for example, by means of a gear. As the temperature falls, the mechanical resistances in the gear and in the drive motor increase, so that at low temperatures an increased effort is required to bring the vehicle seat into the safe sitting position. By taking into account the gear temperature and the motor temperature, for example, the point in time can thus be determined at which the vehicle seat is to be brought into the sitting position or is no longer to be brought into the reclining position.

Furthermore, can be provided that the sitting position is set as a function of a weight load on the vehicle seat by a user and/or as a function of a current angular position of the backrest. It is achieved thereby that when adjusting the seat, it is also taken into account that the adjustment to a safe sitting position requires more force and time with an increased weight load than with a lower weight load. By taking into account the current angular position of the backrest, it is determined, on the one hand, whether the vehicle seat is in a reclining position or in a sitting position, and, on the other hand, it is preferably determined, depending on the current angular position, how far the vehicle seat has to be adjusted in order to reach the safe sitting position. The adjustment time resulting therefrom is preferably compared with a critical adjustment time. If the necessary adjustment time falls below the critical adjustment time, it is not necessary to adjust the sitting position. However, if the necessary adjustment time exceeds the critical adjustment time, the actuator is activated to bring the vehicle seat into a safe sitting position. The actuator is thus controlled in particular as a function of a deviation from the predeterminable limit position with the currently detected angular position of the vehicle seat, in particular its backrest.

In particular, the detected weight load is compared with a predetermined limit weight and the actuator is controlled as a function of the comparison. If the detected weight load exceeds the predetermined limit weight, it is recognized that it would take too long to place the vehicle seat in a safe sitting position, so that the seat is automatically brought into the sitting position or left there to increase driving safety, regardless of the user's request.

The limit temperature can be specified as a function of a current position of the backrest. As a result, the limit temperature is retained as a criterion for the automated seat adjustment regardless of a user request and the limit temperature is specified as a function of the current position, so that a sufficiently rapid adjustment of the vehicle seat into the safe sitting position can always be ensured.

The limit temperature can be reduced with an increasing back angle in the direction of the sitting position. The closer the backrest approaches the safe sitting position of the vehicle seat, the lower the limit temperature specified. Due to the already existing proximity to the safe sitting position, a shorter adjustment path for bringing the backrest into the safe sitting position has to be overcome, which, however, can be implemented by the actuator in sufficient time even at low temperatures.

Furthermore, the limit temperature can be specified as a function of a detected weight load on the vehicle seat; the limit temperature is particularly preferably reduced with a decreasing weight load. This also advantageously ensures a sufficiently rapid adjustment of the vehicle seat into a safe sitting position at all times.

The vehicle seat device of the invention is also characterized in that the control device can be specially adapted to carry out the method of the invention, as described above, when used as intended. This results in the aforementioned advantages.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
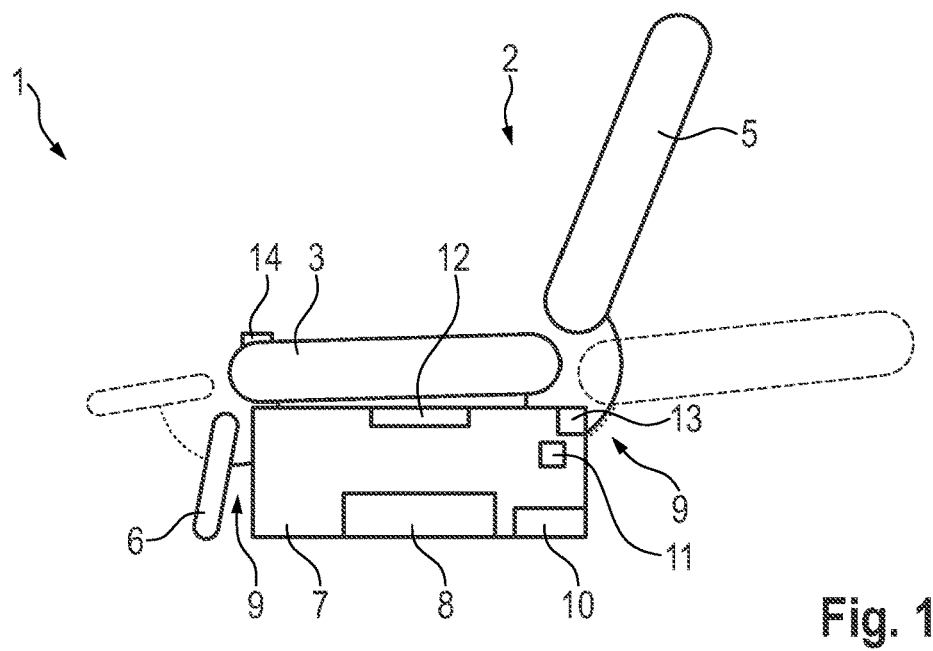
FIG. 1 shows an advantageous vehicle seat device in a simplified illustration.

FIG. 1 shows, in a simplified illustration, an advantageous vehicle seat device 1 in a side view. Vehicle seat device 1 has a vehicle seat 2 which has a substantially horizontally oriented seat part 3 with which a backrest 5 and a leg rest 6 are associated. Backrest 5 and leg rest 6 are shifted pivotably relative to seat part 3 in order to be moved between a vertically oriented sitting position and a horizontally oriented reclining position, shown in FIG. 1 with dashed lines. For this purpose, vehicle seat device 1 also has an actuator 7, which has a drive device 8, which is designed, for example, as an electric motor, and which is connected or coupled to backrest 5 and/or to leg rest 6 by a gear 9, which is only suggested here. In addition, vehicle seat device 1 has a control device 10 which is connected to actuator 7 for controlling it. Vehicle seat device 1 further has at least one temperature sensor 11 in order to detect a vehicle seat temperature T. In particular, for this purpose, temperature sensor 11 is associated with actuator 7, preferably with drive device 8 and/or gear 9.

Furthermore, vehicle seat device 1 optionally has a weight sensor 12 for detecting a weight load on vehicle seat 2 by a user and/or an angle sensor 13 for monitoring a current adjustment angle of backrest 5.

Control device 10 is designed to automatically bring vehicle seat 2 at the request of the user of vehicle seat 2 either into the reclining position, as shown by dashed lines, or into the sitting position, shown by solid lines, with the aid of actuator 7. For this purpose, the vehicle seat has, for example, an input device 14 by means of which the user can specify his desired seat position.

The control device is designed to follow the user's request only if the operating conditions allow a sufficiently rapid bringing of vehicle seat 2 into the sitting position.

Figure 2:
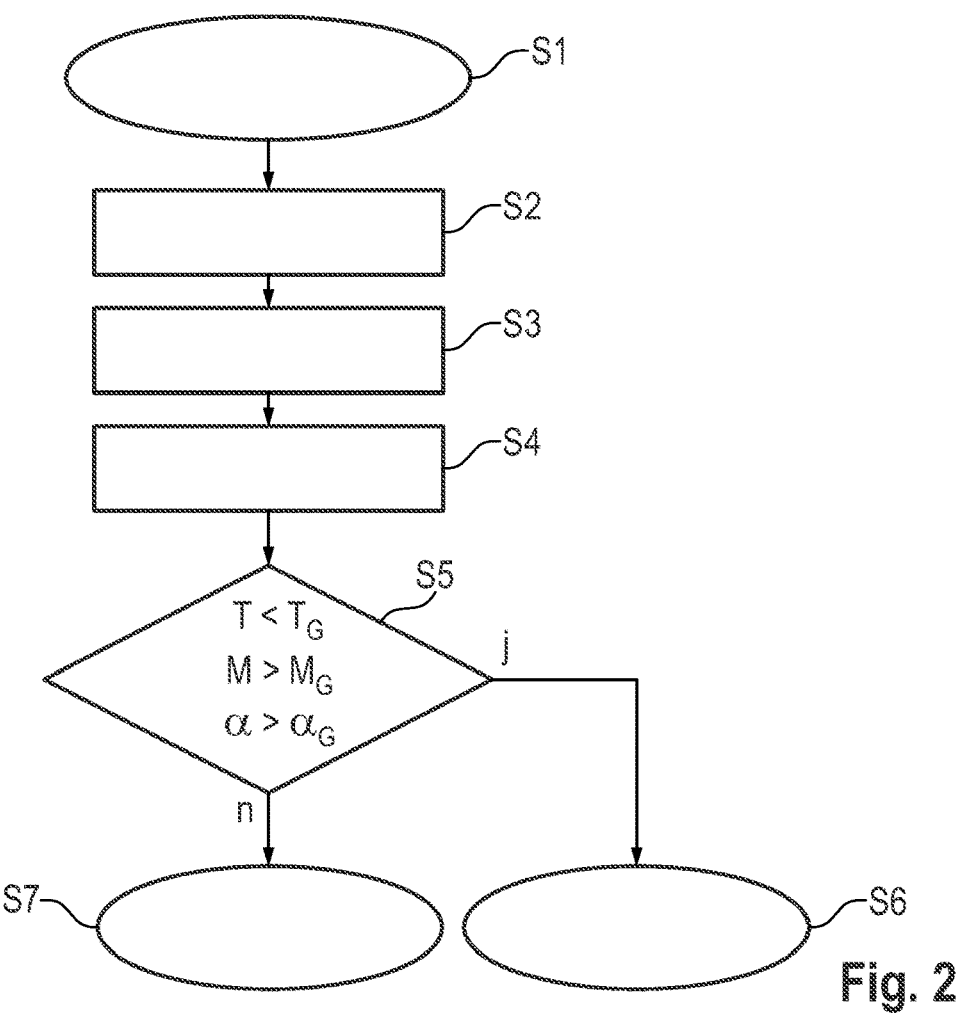
FIG. 2 shows a flowchart to explain a first method for operating the vehicle seat device.

For this purpose, FIG. 2 shows, in a simplified illustration, a first exemplary embodiment of an advantageous method for operating seat device 1, a method which is executed by control device 10. The method begins in a step S1 when the motor vehicle having vehicle seat device 1 is put into operation.

In a subsequent step S2, the seat temperature T is determined by means of temperature sensor 11. In a further step S3, the weight load M is detected by means of weight sensor 12. The current position or angular position $\alpha$ of backrest 5 is detected in a step S4 by means of angle sensor 13. Steps S2, S3 and S4 are carried out simultaneously or one after the other.

Subsequently, in a query S5, the temperature T is compared with a predetermined limit temperature $T_G$, the detected backrest angle $\alpha$ with a predetermined limit angle $\alpha_G$, and the detected weight load M with a predetermined critical limit weight $M_G$. The limit temperature $T_G$, the limit angle $\alpha_G$, and the limit weight $M_G$ are predetermined in knowledge of the mechanical properties of actuator 7 such that if the temperature falls below the limit temperature $T_G$, if the limit angle $\alpha_G$ is exceeded, and if the limit weight $M_G$ is exceeded, it is then recognized that backrest 5, starting from its current position, cannot be brought rapidly enough into the sitting position by actuator 7 to rapidly ensure a sitting position for the user of vehicle seat 2 in particular in the event of a crash. If it is thus recognized in a step S5 that either the detected temperature T exceeds the limit temperature $T_G$, the back angle $\alpha$ exceeds the limit angle $\alpha_G$, or the detected weight M exceeds the limit weight $M_G$ (y), thus in a step S6 actuator 7 is controlled by control device 10 to bring backrest 5 as a precaution into an upright sitting position, as shown in FIG. 1 by the solid line. In this regard, control device 10 controls actuator 7 even if only one of the above-mentioned conditions (T<$T_G$, M>$M_G$, $\alpha$>$\alpha_G$) is fulfilled. If none of the conditions is fulfilled (n), then backrest 5 is left in the current position in a step S7 or the control device follows the user's request and adjusts the backrest to the desired reclining position.

Figure 3:
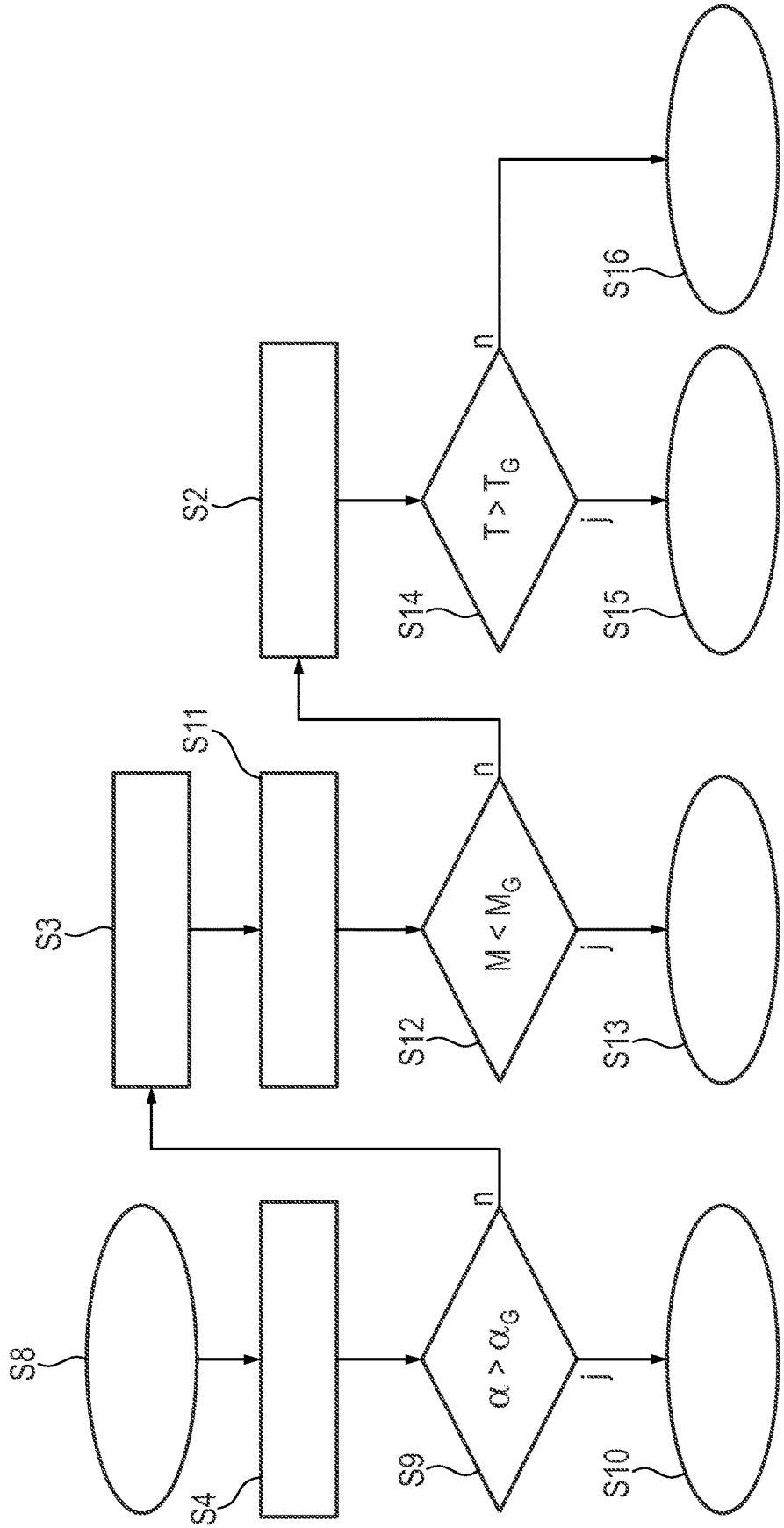
FIG. 3 shows a flowchart to explain a second advantageous method for operating the vehicle seat device.

FIG. 3 shows a further flowchart to explain a further exemplary embodiment of vehicle seat device 1 or the method described above. In this case, the case is considered in particular in which using input means 14 a user specifies a desired position of the backrest or of the vehicle seat which corresponds to a reclining position. The method thus begins in a first step S8 with the input of the desired position. This is followed by step S4, with which the current angular position $\alpha$ of backrest 5 is determined. In a subsequent query S9, the angular position α is compared with the critical back angle $α_G$. If the backrest angle α is smaller than the predetermined limit value $α_G$ (y), control device 10 then controls actuator 7 to adjust the backrest in a step S10 in the direction of the reclining position according to the user's request. However, if the backrest angle α is greater than the limit angle $α_G$ (n), then the load weight M of vehicle seat 2 is determined in the following step S3, as described above. In a subsequent step S11, the detected weight M using the limit weight $M_G$ is divided into weight categories "light" and "normal" to "heavy." In a subsequent query S12, the weight category to which the detected weight belongs is checked. If the weight load M falls into the weight class "light" (y) (below the limit weight $M_G$), thus control device 10 controls actuator 7 in a step S13 to bring the backrest into the reclining position following the user's request.

However, if the detected weight load M does not fall into the category "light" (n), then the seat temperature T is subsequently detected according to step S2. In a subsequent step S14, the detected temperature T is compared with the predetermined limit temperature $T_G$ as previously described. If the detected temperature T is greater than the predetermined limit temperature $T_G$ (y), control device 10 controls actuator 7 in a step S15 to adjust backrest 5 into the reclining position, as requested by the user. In the event that the detected temperature T falls below the limit temperature $T_G$ (n), control device 10 prevents the adjustment of the backrest into the reclining position in a step S16 and for this purpose either leaves the backrest in the current position or shifts it even further in the direction of the safe sitting position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a vehicle seat device for a motor vehicle, which has a vehicle seat with a seat part and a backrest associated with the seat part, and at least one actuator that is associated with the seat part and/or the backrest and via the at least one actuator, the vehicle seat is automatically movable into a sitting position and into a reclining position, the method comprising:
   automatically moving the vehicle seat, via at least one actuator, into a sitting position and into a reclining position based on a vehicle seat position request input by a user and at least one detectable vehicle seat state, the at least one detectable vehicle seat state including a current temperature that is detected by a temperature sensor; and
   monitoring the current temperature via a control device and when the current temperature falls below a limit temperature, the control device instructs the at least one actuator to automatically move the vehicle seat from the reclining position into the sitting position regardless of the vehicle seat position request input by the user or the control device instructs the at least one actuator to maintain the vehicle seat in the sitting position when the vehicle seat is already in the sitting position regardless of the vehicle seat position request input by the user.

2. The method according to claim 1, wherein the current temperature that is monitored includes a temperature of the vehicle seat.

3. The method according to claim 1, wherein the current temperature that is monitored includes a gear temperature of a gear of the at least one actuator or a motor temperature of a drive motor of the at least one actuator.

4. The method according to claim 1, wherein the at least one detectable vehicle seat state further includes a weight load on the vehicle seat detected by a weight sensor and a current angular position of the backrest detected by an angle sensor.

5. The method according to claim 4, wherein the current angular position is compared with a predetermined limit position and the at least one actuator is controlled as a function of the comparison.

6. The method according to claim 4, wherein the weight load on the vehicle seat is compared with a predetermined limit weight and the at least one actuator is controlled as a function of the comparison.

7. The method according to claim 4, wherein the limit temperature is specified as a function of the current angular position of the backrest.

8. The method according to claim 7, wherein the limit temperature is reduced with an increasing angular position of the backrest in a direction of the sitting position.

9. The method according to claim 4, wherein the limit temperature is specified as a function of the detected weight load on the vehicle seat.

10. A vehicle seat device for a motor vehicle, the device comprising:
   a vehicle seat with a seat part and a backrest associated with the seat part; and
   at least one actuator associated with the seat part and/or the backrest and via the at least one actuator, the vehicle seat automatically movable into a sitting position and into a reclining position; and
   a control device that controls the at least one actuator as a function of a vehicle seat position request input by a user and at least one detectable vehicle seat state,
   wherein the control device configured to execute the method according to claim 1.

* * * * *